United States Patent [19]

Tsuji et al.

[11] Patent Number: 5,641,852
[45] Date of Patent: Jun. 24, 1997

[54] THERMOSETTING RESIN COMPOSITION AND METHOD OF MANUFACTURING IT FROM AN EPOXY RESIN, CYANATE AND PHENOL

[75] Inventors: Hiroyuki Tsuji; Shoji Hara; Hirosaku Nagano, all of Otsu, Japan

[73] Assignee: Kanegafuchi Kagaku Kogyo Kabushiki Kaisha, Osaka, Japan

[21] Appl. No.: 586,464

[22] Filed: Jan. 11, 1996

[30] Foreign Application Priority Data

Jan. 11, 1995 [JP] Japan ..................................... 7-019657

[51] Int. Cl.$^6$ .................................................. C08G 73/10
[52] U.S. Cl. .................................. 528/99; 528/96; 528/97; 528/98; 528/104; 528/117; 528/407; 528/362; 525/481; 525/482; 525/484; 525/504; 525/523
[58] Field of Search ............................. 528/104, 117, 528/97, 96, 98, 99, 407, 362; 525/481, 482, 484, 504, 523

[56] References Cited

U.S. PATENT DOCUMENTS 3,491,060  1/1970  Schminke et al. ........................ 260/47
5,442,039  8/1995  Hefner, Jr. et al. ..................... 528/422

Primary Examiner—Frederick Krass
Attorney, Agent, or Firm—Armstrong, Westerman, Hattori, McLeland & Naughton

[57] ABSTRACT

Disclosed is a thermosetting resin composition comprising cyanate resin, a compound containing at least one or more than one of a phenolic hydroxyl radical and an epoxy resin, wherein said resin has excellent adhesive and heat resistant properties while at the same time possessing a low hardening contraction rate and contributing to higher dimensional stability, and method of making the same.

2 Claims, No Drawings

THERMOSETTING RESIN COMPOSITION AND METHOD OF MANUFACTURING IT FROM AN EPOXY RESIN, CYANATE AND PHENOL

BACKGROUND OF THE INVENTION

The present invention relates to thermosetting resin composition that can be used for adhesive agent requiring low hardening contraction rate, coating agent, paint, injection molding resin, sealing resin used for substrates for mounting electronic parts, solder resist, housing material resin for electric and electronic apparatuses, or the like, and method of manufacturing the inventive thermosetting resin composition.

Recently, relative to down-sizing and thinning of electric and electronic parts, circuit structure has also been thinned. However, varied dimensions of built-in parts may incur unwanted failure such as disconnection or short circuit against extremely thinned circuit structure. Thus, highly precise dimensional stability is required for such material used for electric and electronic parts, and as a result, a greater amount of epoxy resinous thermosetting resin has been used for such thermosetting resin composition available for the above material than that was used in the past.

Epoxy resinous thermosetting resin is basically composed of epoxy resin and an epoxy resin hardening agent. Amines, acid anhydrides, polyamides, imidazoles or isocyanates are used for the epoxy resin hardening agent.

Hardening of epoxy resin is promoted by effect of link-breakage reaction of epoxy link generated by the above-cited epoxy resin hardening agent. Incidentally, since molecules of hardened epoxy resin contain polar hydroxyl radical and ether union, hardened epoxy resin exerts distinguished adhesion to other material with substantial adhesive strength. In addition, hardened epoxy resin also contains outstanding heat resistant property and features less hardening contraction than other thermosetting resins. Nevertheless, even though hardened epoxy resin incurs less hardening contraction than other thermosetting resin, since hardening contraction may be the cause of generating crack inside of hardened epoxy resin or deformation of adhered object, hardened epoxy resin is not suited for such uses requiring highly precise dimensional stability. As a method to deal with such problem caused by hardening contraction of thermosetting resin, filler material is blended in resin. However, this method not only causes smoothness on the surface of resin to be spoiled by blended filler material, but it may also cause proper strength of resin to be lowered. On the other hand, since hardening contraction cannot fully be offset by means of content of filler material within scope of maintaining strength of resin, such problem caused by hardening contraction of thermosetting resin has not yet been solved.

To deal with the above-referred problem caused by hardening contraction of thermosetting resin remaining unsettled in the use of epoxy resin or filler-blended epoxy resin, such a method to solve the above problem by introducing thermosetting resin such as cyanate resin having property to generate expansion via hardening has been conceived. Concretely, this method makes up thermosetting resinous component by means of cyanate resin only, or blend comprising cyanate resin and compound including at least one or more than one of phenolic hydroxyl radical or blend comprising cyanate resin and epoxy resin.

Nevertheless, even when introducing one of the above constituent compositions of thermosetting resin, the following problem is generated. Concretely, when introducing constituent composition of the above cyanate resin alone, it is necessary to execute reaction at a high temperature close to 200° C. to fully terminate hardening of cyanate resin, and thus it is by no means suited for sealing resin or solder resist. On the other hand, when introducing such composition comprising cyanate resin and compound containing at least one or more than one of phenolic hydroxyl radical, although hardening of cyanate resin can be promoted at a temperature lower than the case of solely using cyanate resin, since the above composition is insufficient in adhesive strength, it is not suited for an adhesive agent.

On the other hand, another method is also conceived, which combines epoxy resin exerting strong adhesion with cyanate resin so that properties of both resins in blend can properly be harmonized. This method can indeed provide blend with outstanding heat resistant property and adhesive property. However, since cyanate resin also generates reaction with epoxy resin in addition to own hardening reaction, it results in obstacle to hardening reaction of cyanate resin itself. In consequence, hardening expansion proper to cyanate resin cannot fully be exerted to result in diminished effect of including cyanate resin in constituent composition of thermosetting resin in anticipation of such property as exerting hardening expansion.

Under the above circumstances, in order to fully solve the above problems, inventors followed up researches to provide novel thermosetting resin composition capable of generating distinguished adhesive property, heat resistant property, negligible contraction via hardening, and contributing to achieve high dimensional stability before eventually consummating the invention.

BRIEF SUMMARY

The subject of thermosetting resin composition according to the present invention is that thermosetting resin composition comprises cyanate resin, compound which comprises at least 1 or more than 1 phenolic hydroxyl, and epoxy resin.

Other subject of thermosetting resin composition according to the present invention is that thermosetting resin composition comprises imide carbonate and epoxy resin.

Other subject of thermosetting resin composition of the present invention is that said imide carbonate is synthesized by cyanate resin and compound which comprises at least 1 or more than 1 phenolic hydroxyl radical.

The subject of manufacturing method of thermosetting resin composition according to the present invention is that imide carbonate is synthesized by cyanate resin and compound which comprises at least 1 or more than 1 phenolic hydroxyl group under the presence of epoxy resin.

Other subject of manufacturing method of thermosetting resin composition according to the present invention is that imide carbonate is synthesized by cyanate resin and compound which comprises at least 1 or more than 1 phenolic hydroxyl radical under the presence of epoxy resin, and thereafter epoxy resin is added.

Further, other subject of manufacturing method of thermosetting resin composition of the present invention is that imide carbonate is synthesized by cyanate resin and compound which comprises at least 1 or more than 1 phenolic hydroxyl radical under no presence of epoxy resin, and thereafter epoxy resin is added.

DETAILED DESCRIPTION OF THE INVENTION

Essentially, the invention is characterized by arrangement to sustain cyanate resin in the state of being converted into imide carbonate being intermediate of hardened object followed by a step to harden thermosetting resin composition comprising blend of imide carbonate and epoxy resin to cause hardened objects to be generated individually from reactions respectively generated by cyanate resin and epoxy resin. By virtue of converting cyanate resin into imide carbonate, cyanate radical and epoxy radical can be prevented from reacting with each other, and thus respective thermosetting resin components can become hardened object via reaction between respective components. Accordingly, initiation of expansion of cyanate resin via hardening caused by reaction between cyanate radical and epoxy radical can be prevented from being obstructed.

In consequence, even when being blended with epoxy resin, it is possible to exert physical characteristic in terms of expansion via hardening proper to cyanate resin without being reduced. Accordingly, expansion of cyanate resin via hardening fully offsets contraction of epoxy resin via hardening to fully solve problem caused by hardening contraction of thermosetting resin component. In addition, as a result of introducing epoxy resin to compose thermosetting resin component, it is possible to securely provide thermosetting resin composition featuring distinguished adhesive property and heat resistant property. Incidentally, after reaction with cyanate resin, reacted phenolic hydroxyl radical is regenerated relative to progress of hardening reaction of cyanate resin to contribute to hardening of epoxy resin.

Substantially, imide carbonate is an intermediate in previous stage until generation of cyanate-resin hardened object subsequent to reaction between cyanate resin and compound comprising at least one or more than one of phenolic hydroxyl radical. Generation of cyanate-resin hardened object via reaction between cyanate resin and compound comprising at least one or more than one of phenolic hydroxyl radical can be achieved without presence of solvent. However, it is normally quite difficult to effectively discontinue said reaction as of imide-carbonate stage. When organic solvent is present, reaction can be hardly promoted between only cyanate resin and compound comprising at least one or more than one of phenolic hydroxyl radical. When implementing the invention, in order to prevent cyanate radical and epoxy radical from reacting with each other, it is essential that imide carbonate be synthesized and yet reaction be discontinued as of the state of imide carbonate. Means for synthesizing imide carbonate is described below.

When organic solvent is present, by effect of adding epoxy resin to cyanate resin and compound comprising at least one or more than one of phenolic hydroxyl radical, reaction between cyanate resin and said compound comprising at least one or more than one of phenolic hydroxyl radical is effectively promoted to eventually yield imide carbonate. After confirming dissipation of cyanate radical, solvent is added to lower density of generated object so that reaction can be discontinued as of the stage of generating imide carbonate. Dissipation of cyanate radical can be detected via conventional analytical means such as infrared absorbent spectrometer or the like. While the above reaction is underway, epoxy resin substantially remains without generating chemical variation, but instead, it functions as catalyzer for generating imide carbonate. In addition, while the above reaction is underway, epoxy resin is free from generating reaction with cyanate radicals without impeding hardening reaction between respective cyanate radicals.

Reaction for generating imide carbonate under presence of organic solvent can be promoted at normal temperature. It is also possible to contract reaction time by raising reaction temperature by applying solvent having higher boiling point. However, if reaction is promoted too fast, reaction can hardly be controlled (discontinued), and thus, it is desired that reaction be promoted at 20° C.–150° C. Reaction is executed until whole cyanate radicals are converted into imide carbonate. Although depending on reaction temperature, normally, reaction should be executed for an hour through 20 consecutive hours.

After confirming that whole cyanate radicals have been converted into imide carbonate via the above reaction for synthesizing imide carbonate, heating is discontinued and then organic solvent is added to reacted product to lower density thereof before stopping reaction. If reaction is promoted too much, reacted product cannot easily be dissolved in organic solvent, and thus, it is essential that reaction be stopped simultaneous with dissipation of cyanate radicals. Degree of reaction for generating imide carbonate can be evaluated via infrared absorbent spectrometer.

Then, in order to provide thermosetting resin composition with heat resistant property and adhesive property, epoxy resin is added to the yielded imide carbonate. Next, the blend is properly diluted by adding solvent thereto and then sufficiently stirred to eventually complete thermosetting resin composition related to the invention.

As cyanate resin available for implementing the invention, it is desired that monomer derivative aromatic cyanate resin represented by general formula (1) be introduced.

General formula (1):

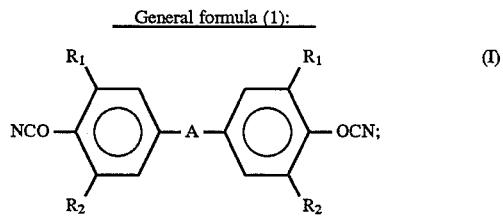

(I)

wherein $R_1$ and $R_2$ respectively designate monovalent substituent and A divalent bonding radical (including monounion).

In particular, in order to effectuate hardening expansion, it is preferred that aromatic cyanate resin represented by general formula (1) be used in a scope of 50% or less than 50% and in oligomerized condition, i.e., in the state in which cyanate radical of 50% or less than 50% of all the cyanate radicals is used in the condition in which triazine link represented by general formula (2) is formed.

General formula (2):

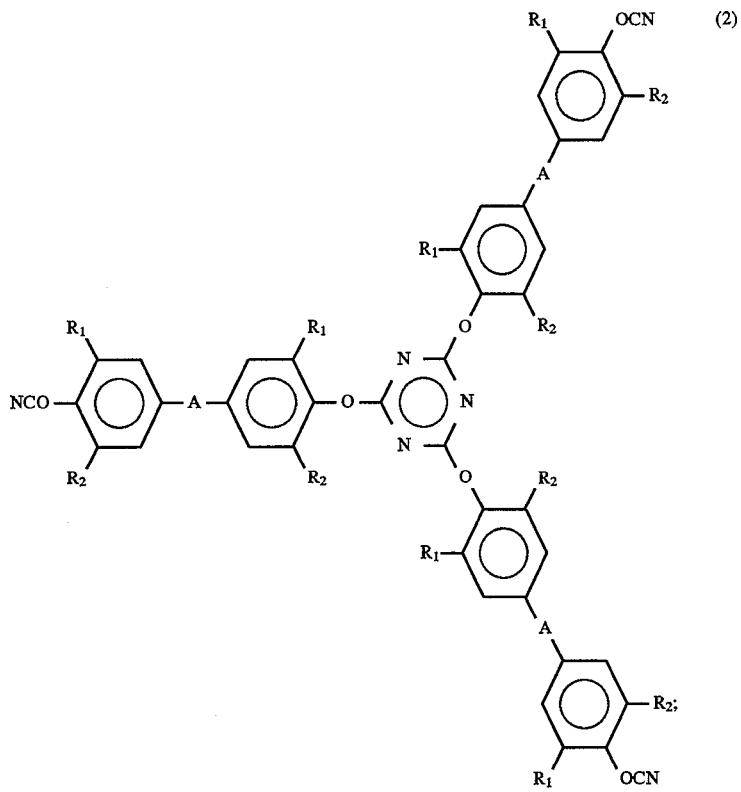

wherein $R_1$ and $R_2$ respectively designate monovalent substituent and A divalent bonding radical (including mono-union).

In aromatic cyanate resin shown by said general formula (1) or (2), $R_1$ and $R_2$ can be identical or different. $R_1$ and $R_2$ radicals are monovalent substituents exemplified by hydrogen, alkyl radical, aryl radical and halogen. etc. Cyanate resin in the case $R_1$, $R_2$ being hydrogen will be preferably used.

It is possible to use methyl radical, ethyl radical, n-propyl radical, isopropyl radical, n-butyl radical, isobutyl radical, t-butyl radical and isomar pentyl radical for alkyl radical. It is preferable to use alkyl radical of 1–4 of carbons, and it is more preferable to use methyl radical, ethyl radical, isopropyl radical and t-butyl radical.

It is possible to use phenyl radical, o-methyl phenyl radical, m-methyl phenyl radical, p-methyl phenyl radical, phenyl radical disubstituted by alkyl radical of 2–4 of carbons, 1-naphthyl radical, 2-naphthyl radical, naphthyl radical substituted by alkyl radical of 1–2 of carbons for aryl radical. It is preferable to use phenyl radical, phenyl radical monosubstituted by alkyl radical of 1–4 of carbons, and phenyl radical disubstituted by alkyl radical of 1–4 of carbons, phenyl radical and phenyl radical monosubstituted by methyl radical.

It is possible to use fluorine, chlorine, bromine and iodine for halogen. It is preferable to use chlorine and bromine for halogen.

To suffice component A shown in the above general formula (1) or (2), it is suggested that not only mono-union and unsubstituted methylene radical, but those radicals cited below can also be used: as methylene radicals in which one or two hydrogen atoms of methylene radical has been substituted with alkyl radical and/or aryl radical, isopropylidene radical, alkylidene radical having 2–10 of carbons, diphenylmethylene radical, phenyl (methyl) methylene radical, phenyl (ethyl) methylene radical, 1,1-ethylene radical, 1,1-propylene radical, and phenyl methylene radical, for example. To suffice divalent pentacyclic or hexacyclic fatty radical, 1,1-cyclopenthylene radical or 1,1-cyclohexylene radical may be used. In addition, it is also preferred that sulfo-acid, divalent sulphur, divalent oxygen, divalent carbonyl radical, tetramethylxylidene radical, or phenylene radical be used. Note that tetramethylxylidene radical corresponds to benzene substituted by means of two units of isopropylidene radical.

Especially it is preferable to use cyanate resin where $R_1$ and $R_2$ in said general formula (1) or (2) are any combination of hydrogen, alkyl radical and halogen radical, and A is any one of unsubstituted methylene radical, isopropylidene radical and oxygen.

When considered from the point of easy obtainability and low cost, it is particularly preferable to use dicyanate of bisphenol A, dicyanate of tetramethylbisphenol F, dicyanate of bisphenol C.

For compound which contains phenol hydroxyl radical, it is preferable to use non-volatile compound exemplified by bisphenols such as bisphenol A, bisphenol F, bisphenol S, etc. or nonyl phenols.

It is possible to use epoxy resins exemplified by bisphenol A type epoxy resin, cresol novolak type epoxy resin, phenol novolak type epoxy resin, naphthalene type epoxy resin, glycylether type epoxy resin and glycylamine type epoxy resin for epoxy resin.

It is desired that the above-referred resin components be used in the form of solvent. Any of the above-cited resin components is blended and stirred with any of those solvents cited below so that the blend solution can be adjusted to an appropriate resin content rate. The following solvents are suggested for use; acetone, methyl-ethyl ketone, toluene, chlorobenzene, trichloro ethylene, methylene chloride, methyl cellosolve, ethyl cellosolve, dimethylformamide, dimethylacetoamide, methanol, ethanol, or isopropyl alcohol. In addition, any of the above-cited solvents can also be used as organic solvent in the course of reaction for generating imide carbonate. Resin content rate of thermosetting resin composition can properly be adjusted by way of considering viscosity, dissolubility, and handling characteristic of adhesive agent. Based on the consideration of these, it is preferred that actual resin content be in a range from 5% to 60% by weight, more preferably, it should be in a range from 10% to 50% by weight.

In the case of causing cyanate resin to react with compound comprising at least one or more than one of phenolic hydroxyl radical without presence of solvent, reacting components can be held in the state of imide carbonate by controlling reaction via the method shown below for example while paying attention to the rise of viscosity of after starting off the reaction. Any of the above-cited solvents can also be used to restrict reaction for generating imide carbonate under absence of solvent.

In order to absorb heat generated by reaction, sufficient cooling may be applied immediately after initiation of the reaction to permit the reaction to be discontinued as of the stage of generating imide carbonate.

It is also possible to properly constrain progress of reaction by way of mixing an appropriate amount of organic solvent in the resin component simultaneous with initiation of the reaction so that the reaction can be discontinued as of the stage of generating imide carbonate. In order to promote yield rate, it is desired that speed of feeding organic solvent to be mixed in the resin component be of maximum limit within a range enabling the reaction to be continued without obstructing progress of the reaction.

It is also possible to quickly promote reaction and discontinue it as of the stage of generating imide carbonate by way of lowering density of imide carbonate via addition of organic solvent to resin component immediately after initiation of the reaction under presence of epoxy resin.

In the course of executing reaction for synthesizing imide carbonate, after confirming that all the cyanate radicals have been converted into imide carbonate, organic solvent is added to imide carbonate to lower density of the reacted product to cause the reaction to be discontinued.

Next, in order to provide thermosetting resin composition with heat resistant property and adhesive property, epoxy resin is added to the yielded imide carbonate, and then blend solution is properly diluted by means of solvent and sufficiently stirred before eventually yielding thermosetting resin composition related to the invention.

Epoxy resin added as catalyzer before generation of imide carbonate remains without substantially being reduced even after generation of imide carbonate, and thus, remaining epoxy resin can replace part or whole of epoxy resin that should be added after termination of reaction. Accordingly, in the event that the whole amount of epoxy resin that should be combined with the inventive thermosetting resin composition is already present in the resin compound at the time of synthesizing imide carbonate, it is permissible to delete addition of epoxy resin after synthesizing imide carbonate. Either one kind or mixture of two or more than two kinds of epoxy resin may be introduced.

The inventive thermosetting resin composition consummated via the above processes may be coated on the surface of polyimide film for example and then cured via a heating process at 150° C. for an hour. Needless to mention that heating temperature and duration are variable according to compound constituent, compound ratio, and thickness of coated film of thermosetting resin composition. When blending resin components, it is permissible to initially dilute respective resin components with solvent to generate easily manageable viscosity before implementing blending. The invention can be implemented by way of adding various improvements, changes, and modifications based on knowledge of those skilled in the art within a scope without deviating from substantial essence of the invention.

As is apparent from the foregoing description, since the inventive thermosetting resin composition is characterized by outstanding adhesive property, heat resistant property, and distinguished dimensional stability by virtue of minimum contraction via hardening, the inventive thermosetting resin composition can ideally be used for composing adhesive agent, coating agent, injection molding resin, sealing resin for composing substrates for mounting electronic parts, solder resist, and housing-material resin for electric and electronic apparatuses or the like for example.

The invention is more concretely described below by way of citing actual examples. It should be understood however that the scope of the invention is by no means confined to the following examples. Note that terms "parts" shown in the following description indicates "parts by weight" and "IR" infrared absorbent spectrum, respectively.

EXAMPLE 1

Initially, 40 parts of tetramethyl-bisphenol F dicyanate M-30 (cyanate resin, a product of Chiba-Geigy Japan, Ltd.), 20 parts of bisphenol A (phenolic resin), 20 parts of "Epicoat" 828 (epoxy resin, a product of Yuka-Shell Epoxy Co., Ltd.), and 40 parts of methyl ethyl ketone, were blended, and then blended solution was sufficiently stirred and heated at 80° C. for 4 hours to implement reaction.

Next, it was confirmed via IR that cyanate radical was fully converted into imide carbonate, and then 40 parts of methyl ethyl ketone was quickly added to imide carbonate to stop reaction, and finally imide-carbonate blended composition was yielded.

Next, 50 parts of the yielded imide-carbonate blended composition, 20 parts of "Epicoat" 1001 (epoxy resin, a product of Yuka Shell Epoxy Co., Ltd.), and 50 parts of methyl ethyl ketone, were blended, and then blended solution was sufficiently stirred before eventually yielding thermosetting resin composition.

Then, the yielded thermosetting resin composition was uniformly coated on the surface of polyimide film "Apical" (a product and a registered trade name of Kanegafuchi Chemical Industry Co., Ltd.) so that 15 µm of thickness could evenly be achieved, and then the coated film was heated at 150° C. for 3 hours to implement curing. Next, bending of the coated polyimide film before and after curing was measured to evaluate hardening contraction of the thermosetting resin composition. Mean height value of square of sample cut out by 35 mm×40 mm of size was applied as the scale of evaluating bending. By referring to this scale, bending when the thermosetting resin composition was on the top surface was designated by minus (−), whereas bending when the polyimide film was on the top surface was designated by plus (+). In addition, in order to evaluate adhesion effect between the thermosetting resin composition and the polyimide film, after coating the thermosetting resin composition over the polyimide film, copper foil complete with surface treatment by means of silane coupling agent was laminated thereon at 120° C. to complete sample for evaluating peeling strength between the thermosetting resin composition and the polyimide film. Then, after preparing 1 cm-wide measurement pattern, the sample was tested to evaluate 90° peeling strength at 20° C. and 150° C. Test results are shown in Table 1.

TABLE 1

|  | bending (mm) | peeling strength (kg/cm) | |
|---|---|---|---|
|  |  | 20° C. | 150° C. |
| EXAMPLE 1 | +0.1 | 1.5 | 0.9 |
| COMPARATIVE EXAMPLE 1 | −1.8 | 1.3 | 0.7 |
| COMPARATIVE EXAMPLE 2 | +1.8 | 1.2 | 0.4 |
| COMPARATIVE EXAMPLE 3 | +1.2 | 1.8 | 0.8 |

COMPARATIVE EXAMPLE 1

Initially, thermosetting resin composition was yielded by blending 60 parts of epoxy resin "Epicoat" 1001 (a product of Yuka-Shell Epoxy Co., Ltd.), 10 parts of diaminophenylsulfone serving as curing agent, and 50 parts of methyl ethyl ketone. Using the yielded thermosetting resin composition, sample was prepared in the same way as was done for the Example 1. Next, bending of polyimide film before and after curing was measured to evaluate hardening contraction of adhesive agent. Likewise, pattern for evaluating peeling strength was prepared, and then, 90° peeling strength was measured at 20° C. and 150° C. Test results are also shown in Table 1.

COMPARATIVE EXAMPLE 2

Initially, thermosetting resin composition was yielded by blending 50 parts of imide carbonate blended composition formulated as per the Example 1, and 50 parts of methyl ethyl ketone. Using the yielded thermosetting resin composition, sample was prepared in the same way as was done for the Example 1. Next, bending of polyimide film before and after curing was measured to evaluate hardening contraction of adhesive agent. In addition, pattern for evaluating peeling strength was prepared, and then, 90° peeling strength was measured at 20° C. and 150° C. Test results are also shown in Table 1.

COMPARATIVE EXAMPLE 3

Initially, thermosetting resin composition was yielded by blending 40 parts of tetramethylbisphenol F dicyanate M-30 (a product of Chiba-Geigy Japan, Ltd.), 20 parts of "Epicoat" 1001 (a product of Yuka-Shell Epoxy Co., Ltd.), and 50 parts of methyl ethyl ketone. Using the yielded thermosetting resin composition, sample was prepared as was done for the Example 1. Next, bending of polyimide film before and after curing was measured to evaluate hardening contraction of adhesive agent. In addition, pattern for evaluating peeling strength was prepared, and then, 90° peeling strength was measured at 20° C. and 150° C. Test results are shown in Table 1.

EXAMPLE 2

Initially, 40 parts of tetramethylbisphenol F dicyanate M-30 (cyanate resin, a product of Chiba-Geigy Japan, Ltd.), 20 parts of bisphenol A (phenolic resin), 20 parts of "Epicoat" 828 (epoxy resin, a product of Yuka-Shell Epoxy Co., Ltd.), and 40 parts of methyl ethyl ketone, were blended and sufficiently stirred. Next, the blend solution was heated at 80° C. for 4 hours to generate reaction, and then, rate of conversion of cyanate radicals into imide carbonate per hour after initiation of heating was measured by applying IR. Test results are shown in Table 2. Note that conversion rate into imide carbonate means mol rate of cyanate radicals converted into imide carbonate among all cyanate radicals present in cyanate resin.

TABLE 2

| reaction time (hr.) | conversion rate of imide carbonate (%) | | | |
|---|---|---|---|---|
|  | 1 | 2 | 3 | 4 |
| EXAMPLE 2 | 12 | 25 | 38 | 100 |
| COMPARATIVE EXAMPLE 4 | 0 | 0 | 0 | 0 |

COMPARATIVE EXAMPLE 4

Initially, 40 parts of tetramethylbisphenol F dicyanate M-30 (cyanate resin, a product of Chiba-Geigy Japan, Ltd.), 20 parts of bisphenol A (phenolic resin), and 40 parts of methyl ethyl ketone, were blended and then sufficiently stirred. Next, the blend solution was heated at 80° C. for 4 hours to generate reaction. Then, as was done for the Example 2, after initiation of the heating, rate of conversion of cyanate radicals into imide carbonate was measured every hour. Test results are also shown in Table 2.

What is claimed is:

1. A method for manufacturing a thermosetting resin composition comprising the step of synthesizing an imide carbonate by reacting a cyanate resin and a compound containing at least one phenolic hydroxyl radical, said synthesis being conducted in the presence of an epoxy resin, wherein the reaction is stopped upon confirmation of complete conversion of cyanate radicals to imido carbonate, and wherein the epoxy resin remains unreacted.

2. A method for manufacturing a thermosetting resin composition according to claim 1 comprising the further step of adding additional epoxy resin to the composition.

* * * * *